United States Patent [19]

Sauvanet

[11] 4,365,329
[45] Dec. 21, 1982

[54] PROCESS AND DEVICE FOR PHASING A LOCAL CLOCK

[75] Inventor: Maurice Sauvanet, Paris, France
[73] Assignee: Thomson-CSF, Paris, France
[21] Appl. No.: 172,192
[22] Filed: Jul. 25, 1980
[30] Foreign Application Priority Data
  Jul. 27, 1979 [FR] France .................. 79 19425
[51] Int. Cl.$^3$ .................. H04J 3/06; H04L 7/04
[52] U.S. Cl. .................. 370/100; 375/110; 375/111
[58] Field of Search ............... 370/100, 108; 375/110, 375/111

[56] References Cited

U.S. PATENT DOCUMENTS

| | | | |
|---|---|---|---|
| 3,701,894 | 10/1972 | Low et al. | 375/110 |
| 4,034,352 | 7/1977 | Hotchkiss | 375/111 |
| 4,180,701 | 12/1979 | Louth et al. | 375/110 |

Primary Examiner—Douglas W. Olms
Attorney, Agent, or Firm—Cushman, Darby & Cushman

[57] ABSTRACT

The most favorable clock signal among n available signals which present equal successive phase shifts is selected by comparison with a synchronization burst. For this, a logic phase comparison is effected between the signals obtained by division by 2 of each of the n clock phases with the bits of the synchronization burst by averaging the comparison signal obtained over several bits, and the most favorable clock phase is selected, corresponding to a phase shift close to $\pi$, as being the one represented by a voltage level located within a determined interval F.

15 Claims, 8 Drawing Figures

PROCESS AND DEVICE FOR PHASING A LOCAL CLOCK

BACKGROUND OF THE INVENTION

The present invention relates to a process for phasing a local clock, as well as a device for implementing this process, this in the field of systems for receiving data transmitted in digital form, in particular systems using the support medium formed by a television video signal for conveying information coded in digital form, these systems being known under the name "videotext".

It will be recalled that, in this kind of system, messages are transmitted in digital form using a binary code without zero return, by means of data packages coming from one or more sources, each data package being preceded by a burst of identification and synchronization pulses, formed by a succession of alternate 1s and 0s. This burst forms, for the data package which follows, a "heading" intended among other things for identifying the corresponding information source, but its role is also to supply a reference signal, at a given frequency and phase, to which is to be tuned a local clock of the receiver from which the decoding of the message contained in the data package is effected. More particularly, in the "videotext" system considered here, the data packages are inserted in television lines, each package being thus placed between two "line sync" signals usual in television, the technique used being that of time multiplexing of the digital signals with an analog image signal, which allows the existing frequency bands allocated to the broadcasting of television programs to be used. The data packages are thus transmitted over several successive lines or possibly over one isolated line among others containing simply the television image information. For a data package corresponding to a television line, there is inserted, after the "line sync" signal, the synchronization burst then the data package, the duration of said burst being small with respect to that of the data package (in a ratio less than 1/10) and, especially, with respect to the intervals which may separate two successive packages.

The chosen transmission technique requires a demodulation assembly comprising a television receiver associated with an interface system, adapted to be connected to a terminal on which the transmitted message is reconstituted. The interface is formed of a logic part capable of selecting the desired source and a demultiplexing part which retrieves from the video signal the digital information and reshapes it.

It is this demultiplexing part which, in order to reconstitute the data transmitted in packages, includes the local clock and the means for rephasing said clock as a function of the pulses of the burst preceding each data package. It is desirable to synchronize in frequency and in phase an oscillator forming this local clock, during a fraction of the duration of the burst, and then to maintain its frequency and its phase, with sufficient stability, for a considerably longer time, taking into account the above-mentioned relationship between the duration of the burst and that of the data package.

These considerations lead most often to choosing a local clock formed by a very stable oscillator, for example a quartz oscillator, whose frequency is set by construction at a value double that of the pulses of the synchronization burst, this taking into account the choice of coding without zero return. The ideal reading clock is that one whose pulses have active fronts placed in the middle of the 1s and 0s of the synchronization burst. In order to approximate this ideal clock, there is derived from a local oscillator having the desired frequency four clock signals of the same frequency but having phase shifts equal to a quarter of their common period. A stable oscillator may also be used whose frequency is a multiple of the desired clock frequency, and the four clock signals of different phases may be obtained by successive frequency divisions, which comes to the same thing. By phase comparisons, between each of the clock signals and the synchronization burst, the clock signal is determined which presents a minimum phase deviation with respect to the synchronization burst, so the available clock signal having the most favorable phase failing the ideal signal.

This is illustrated by the diagram of FIG. 1 of the enclosed drawings, in which there is shown, from top to bottom:

the synchronization burst S;

the ideal clock pulses HO, having a frequency double that of the burst, and whose rising fronts are exactly centered on the 1s and the 0s of said burst;

the four clock signals H1, H2, H3 and H4 having equal successive phase shifts.

In the example considered, it is clock signal H3 which is selected.

To effect this selection, means have already been proposed for instant phase comparison, comprising flip-flops and a multiplexer, in which a transition of the burst samples two reference phases if four clock signals are available. According as to whether the result is a logic 1 or 0 on each of the two measuring paths of the circuit, it can in theory be determined which of the four available phases is the most favorably placed with respect to the synchronization burst. However it is difficult, in practice, to distinguish a transition of the synchronization burst from a spurious noise pulse. Furthermore, the results obtained are only coherent if the shaped signal, on which this comparison with the available clock phases is effected, presents a strict equality of duration of the 1s and the 0s, i.e. if the taking of the average value giving this signal was perfect, and if this signal does not comprise large random phase fluctuations.

To avoid these disadvantages, it is desirable to compare the local clock phases not with a transition of the synchronization burst but with a state of the bits of said burst, and to average out the result of comparisons made over several bits. To this end, one solution consists in effecting the logic comparison of the signal forming the burst with the signal resulting from the frequency division by 2 of a local clock phase, the average duration of the pulses resulting from this comparison varying proportionally with the phase shift between the two signals. An analog comparison between the result of the preceding operation and predetermined levels could then enable the most favorable clock phase to be selected, particularly by comparing voltage levels.

To illustrate this, FIG. 5 shows, in the form of a simplified diagram, a device belonging to the state of the technique, in which selection is effected between four clock phases H1, H2, H3 and H4. The phase comparison is made between the synchronization burst S and one of the clock phases, for example the one marked H1. To this end, clock phase H1 is brought to a frequency divider by 2, designated by the reference 1, which delivers a signal h1. The bits of burst S and signal h1 are fed respectively to two inputs of a logic "exclusive OR" gate 2, whose output is connected to a low-pass filter 3, formed by an R-C circuit. This circuit delivers a voltage V representing the average value, over several bits of burst S, of the comparison signal obtained at the output of gate 2.

Voltage V is fed to one of the inputs of four comparators 4, which receive also, at their other input, four respective voltage levels V1, V2, V3 and V4, representative of the voltage obtained for the phase shifts corresponding to those of clock phases H1, H2, H3 and H4. The outputs of the comparators are connected to a priority logic 5, associated with a sampling and memorizing stage 6. Finally a multiplexer 7 has its data inputs connected to four available clock signals H1 to H4, and its address inputs connected to the outputs of the sampling and memorization stage 6. At the output of the multiplexer there is delivered the selected clock phase HS, this at the moment when a pulse u appears determining the sampling and memorization of the output signals of comparators 4.

However, the process used by this device comprises an indetermination which is illustrated by the diagrams of FIGS. 2 and 3. In the diagram of FIG. 2, the first three lines are respectively the synchronization burst S, an available local clock phase H1 and the signal h1 resulting from the division of frequency by 2. On the last line are shown the pulses obtained by the combination of signals S and h1 given by the logic "exclusive OR" operation, these pulses forming the comparison signal.

In cases I and II, as illustrated by the arrows and the broken line in FIG. 2, a greater delay of the clock phase h1 with respect to burst S gives rise to an elongation of the pulses of the comparison signal. On the contrary, in case III of FIG. 2, a greater delay of clock phase h1 with respect to burst S gives rise to a narrowing of the pulses of the comparison signal. Comparison of cases I and III, in particular, shows that the results obtained are different, although they correspond to the same phase shift between clock phase H1 and burst S. More generally, it is noted that the direction of variation (elongation or narrowing) is reversed when the phase shift of signal h1 in relation to signal S exceeds the width of a 1 of the burst, which gives two possible values for the voltage obtained representing the average value of the comparison signal, for the same phase shift.

This is illustrated by the diagram of FIG. 3, where there is shown as abscissa the delay $\phi$ of the clock phase H1 with respect to burst S and as ordinates the average voltage V at the output of the phase comparator. The values and variations of this voltage V, between 0 and a maximum value VM, are indicated for the preceding cases I, II and III. If we accept the special case of a phase shift equal to $\pi$, it is both the values of voltage V and its direction of variation which are different (compare the straight lines corresponding to cases I-II and to case III).

This disadvantage could be eliminated by conditioning the bringing into service of the divider by 2, giving the signal h1 from clock phase H1, by a determined change of state of signal S (synchronization burst). For example, as soon as the first 1 of this synchronization burst appears, the changes of state of the divider by 2, previously maintained at 0, are enabled. This operation ensures a theoretically determined positioning of the 1s of signal h1 with respect to the 1s of burst S, so as to exclude for example case III previously considered, and so provides a determined direction of variation of voltage V, forming the comparison signal, for an increasing phase shift between signals S and h1.

However, because of the slight inevitable delay of the signal enabling the changes of state of the divider by 2, with respect to the appearance of the first 1 of the burst, and also because of the random phase fluctuations of the fronts of the burst as well as errors of centering of the chopping of the data at the beginning of the burst, there will necessarily exist an indecision concerning the time of enabling the divider by 2, relative to the changes of state of the burst. The result is that, in extreme but not excluded cases, the delay of signal h1 with respect to burst S may exceed the width of a bit of the burst, which results in an erroneous indication V for the clock phase to be selected.

This is made understandable by the diagram of FIG. 4 of the accompanying drawings, in which the upper lines represent the synchronization burst S, the signal z for enabling the divider, and the available clock signal H1 whose phase, with respect to burst S, is close to 0 or $2\pi$ (which means that the active front of signal H1 takes place close to a transition of the burst). Division by 2 of clock signal H1 gives then two possible different signals, marked h1 and h'1, and the result is two possible different values at the output of the phase comparator (as illustrated by the hatched zones in the diagram). This serious disadvantage, appearing for phases close to 0 or $2\pi$ which are thus the above-mentioned "extreme cases", does not exist for the other intermediate phases, as illustrated by the lower lines of FIG. 4 on which are shown:

clock signal H2 and signal h2 resulting therefrom by division by 2 (phase $\pi/2$), clock signal H3 and signal h3 resulting therefrom by division by 2 (phase $\pi$), clock signal H4 and signal h4 resulting therefrom by division by 2 (phase $3\pi/2$).

It will be noted, in particular, that the initiation of division by 2 is ensured without difficulty, i.e. without indecision of $\pi$, if we consider reference clock H3, corresponding to signal h3 shifted by $\pi$ with respect to the first front of burst S.

The present invention aims at bringing a solution to the whole of the problems outlined above, so as to obtain the most favorable clock phase selection, as much as possible without error, indetermination or indecision.

SUMMARY OF THE INVENTION

For this, the invention provides essentially a process for phasing a local clock, in which the most favorable clock signal is selected among n available signals of the same frequency presenting equal successive phase shifts, compared with a synchronization burst, and in which, more particularly, a logic phase comparison is made between signals obtained by the division of frequency by 2 of each of the n available clock phases with the bits of the synchronization burst, these divisions by 2 being enabled as soon as the first bit of said burst appears, the comparison signal obtained is averaged over several bits of this synchronization burst and the clock phase is selected which corresponds to a phase shift close to $\pi$.

Thus all the difficulties mentioned above are avoided, since:

on the one hand, the comparison is effected on states of the synchronization burst, and not on transitions of this burst; the result of the comparison is averaged over several successive measurements, which removes the errors due to random fluctuations; and the bringing into service of the divisions by 2 is conditioned by a determined change of state of the burst, so imposes a determined direction of variation of the comparison signal, which avoids the indetermination illustrated by FIGS. 2 and 3;

on the other hand, the indecision revealed by FIG. 4 is eliminated, by effecting the comparison with the phase of each of the available local clock signals, then by taking into account only the comparison results corresponding to clock phases close to $\pi$, (and not by basing the selection on a scale of voltages which would be obtained by comparison with the burst of an arbitrary phase reference clock alone).

It will be noted that this $\pi$ shift is optimum not only from the point of view of dividing the clock signals by 2 for phase comparison, but also for phase measurement, since it corresponds to the crossing of two possible directions of variation of voltage V forming the comparison signal (see FIG. 3), so may give the same value VM/2 of this signal V for two reverse polarities of the signal resulting from the division by 2. The process of the invention thus forms a sort of "zero method" avoiding all doubtful cases.

From these considerations there results therefore a preferred method of implementing the process of the invention consisting of a "zero method", in which the comparison signals are electric voltages obtained at the output of integrator circuits and in which these voltages are compared with voltage levels representing the phase shift values close to $\pi$. This is what is illustrated in FIG. 3, where four voltage levels are shown V1, V2, V3 and V4, in the case of four available phases, the comparison being effected in the interval between V2 and V3.

Taking into account the fact that the clock phase to be selected is the one which corresponds to a phase shift close to $\pi$, the process is implemented by selecting the most favorable clock phase as being the one represented by a voltage level which is located within an interval or "window" centered substantially on a value equal to half of the probable maximum value of the voltage forming the comparison signal, i.e. the voltage which would be obtained for the maximum phase shift $2\pi$.

According to a complementary feature of the process, the maximum probable value, from which the above-mentioned "window" is defined, is generated not from a DC supply voltage, but so as to be established progressively, at the same time with the same relative variations as the voltage forming the comparison signal. This allows the final measurement to be effected accurately, before the average value of the comparison signal has had the time to establish itself completely. The above-mentioned value may, for example, be established progressively by averaging a logic signal beginning at the moment when the divisions by 2 begin.

The ideal comparison "window" would have a width equal to VM/n, and it would be equally distributed on each side of the central value VM/2, if VM designates the maximum value of the comparison signal and n the number of available clock phases. However the least deviation of the real width of this "window" with respect to the previously-mentioned theoretical value would risk: either giving two simultaneous selection indications, resulting in an indecision on the choice of two consecutive clock phases, or no indication, so that none of the available phases would be selected, which is more serious.

To avoid this difficulty, a solution coming within the scope of the present invention, consists in providing a "window" having a width slightly greater than the ideal value VM/n, and slightly offcentered, in a determined direction, with respect to the ideal central value VM/2, and in selecting that one of the two available clock phases, obtained possibly by comparison with said "window", which is the most advanced or the most delayed. In other words, a "window" is voluntarily chosen having a width greater than the ideal value, so as to definitively avoid the very troublesome case where no selection indication is given, and a logic rule is chosen giving privilege to one of the indications obtained, in the case which is still possible where two simultaneous indications are obtained, taking into account the width given to the "window". Moreover, it is advisable to compensate for the offcentering of the "window", by choosing the best of the two indications obtained. To this end, the "window" is for example offcentered, in the direction of a greater phase delay, with respect to its ideal value, and in the case of two indications, the one will be selected which corresponds to the most advanced available clock phase.

The invention also provides an electronic device for implementing this process for phasing a local clock.

This device comprises essentially:
a divider by 2 of each of the n available clock phases,
means for enabling each divider by 2,
logic means for comparison between the signals obtained at the output of each divider by 2 and the bits of the synchronization burst,
a circuit connected to the output of said logic comparison means, and adapted to supply a voltage representing the average value of the comparison signal obtained over several bits,
other comparison means, adapted to compare the above-mentioned voltage with the determined levels,
a sampling and memorization stage, associated with a priority logic,
a multiplexer, whose data inputs receive the n available clock signals, and whose address inputs are connected to the outputs of the preceding stage.

In a simple embodiment, the logic means for comparison between the signals obtained at the output of each divider by 2 and the bits of the synchronization burst are formed by a logic "exclusive OR" gate.

According to a particular embodiment, the device considered comprises n dividers by 2, connected to common enabling means and receiving respectively the n available clock signals, the output of each divider by 2 being connected to an input of a respective logic "exclusive OR" gate, whose other input receives the bits of the synchronization burst, the output of each of the n "exclusive OR" gates being connected, through n low-pass filters giving a voltage representative of the average value of the comparison signal obtained at the output of each of the above-mentioned gates, to n voltage "window" comparators all receiving the same two threshold values, the outputs of these "windows" comparators being connected to the sampling and memorization stage.

These latter comparators determine which of the indications of the n phase comparators, formed by the n logic "exclusive OR" gates, falls in the voltage interval previously called "window", extending on each side of the maximum half-value VM/2. So that the maximum value VM may be established progressively, and so that the "window" has the desired width and the desired offcentering with respect to value VM/2, as explained above, it is advantageously provided, in the device of the invention, for the means for enabling the dividers by 2 to have their output connected also to an additional low-pass filter, identical to those placed at the output of the n "exclusive OR" gates, and for the voltage delivered by this additional filter to supply a voltage divider giving two proportional voltages corresponding to the limits of the desired "window", these two voltages being fed to the threshold value inputs of the n "window" comparators. With this particular arrangement, not only can the sampling be carried out before the average value of the comparison signal has had the time to establish itself completely, as has already been pointed out, but also, conversely, the voltages resulting from the comparison by the "exclusive OR" gates may be better smoothed, by lowering the cut-off frequency of the low-pass filters.

In any case, the invention will be well understood with the help of the description which follows, in conjunction with the accompanying schematic drawings representing, by way of non-limiting example, one embodiment of this device for phasing a local clock, and illustrating the operation of this device.

DESCRIPTION OF THE PREFERRED EMBODIMENT

Figure 6:
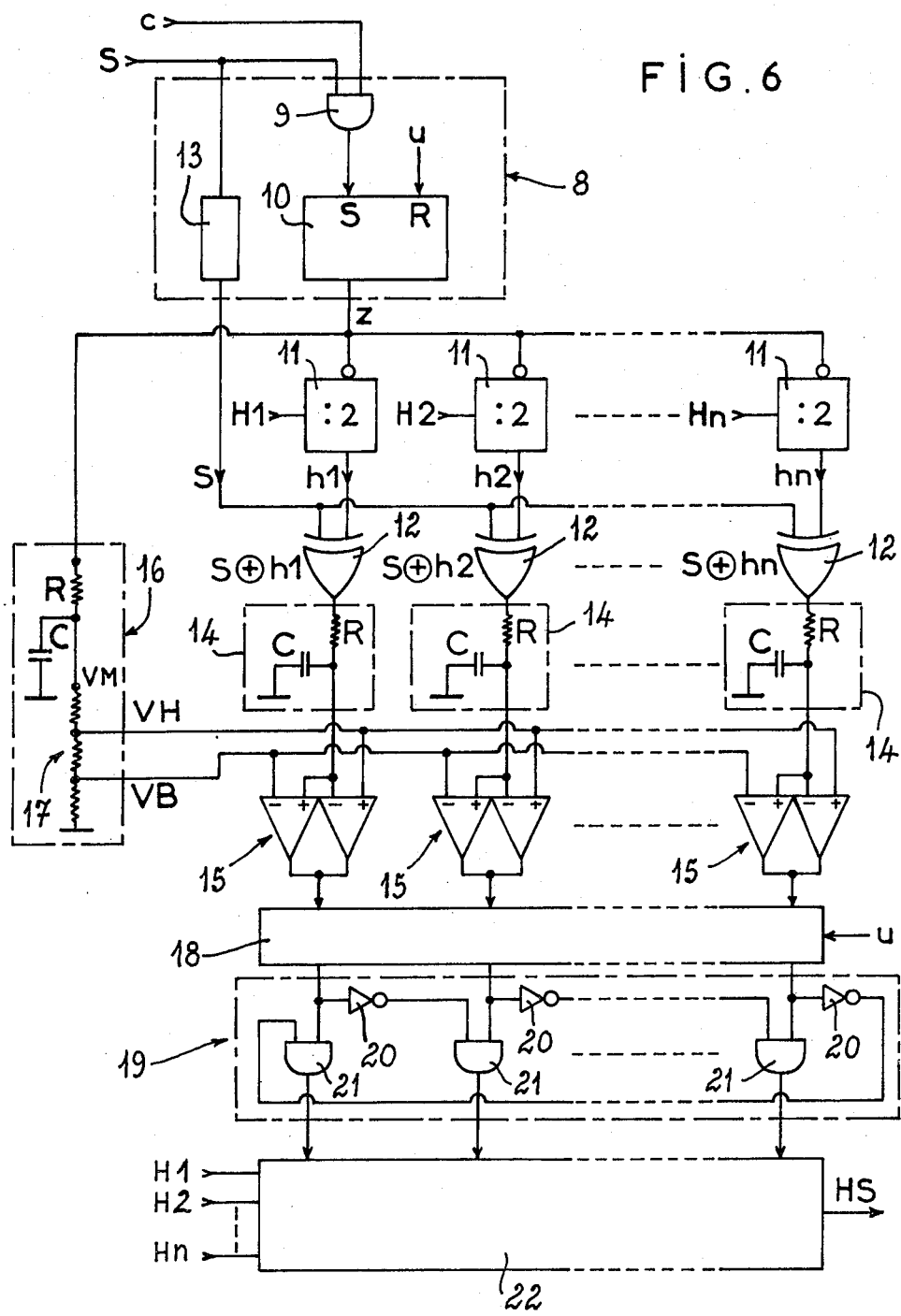
FIG. 6 is a diagram showing one embodiment of a device of the invention, in the general case of selection made between n phases.

In FIG. 6, a circuit 8 for making the divisions by 2 dependent on a change of state of a bit of burst S, comprises a logic gate 9 and a flip-flop 10 of type "R-S"; gate 9 receives, at both its inputs, the synchronization burst S and a pulse c for enabling counting (appearing at the beginning of the television "line", in the application under consideration), whereas flip-flop 10 receives, at its "S" input, the output signal from gate 9 and, at its "R" input, the sampling pulse u. Flip-flop 10 delivers an enabling signal marked z, and pulse u, which not only controls the sampling but also resets flip-flop 10, appears after a definite duration counted, by means not shown, from the appearance of signal z.

This signal z is fed to the enabling inputs of n frequency dividers by 2 designated by the reference 11. These dividers 11 generate, from the n available clock signals H1, H2 . . . Hn, the respective signals h1, h2 . . . hn. The output of each divider 11 is connected to an input of a logic "exclusive OR" gate 12. All the gates 12 receive, at their second input, the bits of the synchronization burst S, slightly shifted by means of a delay stage 13 to take into account the response time of dividers 11.

The output of each "exclusive OR" gate 12 is connected to a low-pass filter 14, formed by an R-C circuit, which delivers a voltage representing the average value of the comparison signal obtained at the output of the corresponding gate 12. The outputs of the n low-pass filters 14 are connected to n voltage "window" comparators 15; each comparator 15 may be likened to two comparators joined together, one of which receives the voltage delivered by the corresponding filter 14 at its inverting input, and the other of which receives the same voltage at its non-inverting input.

The other inputs of each "window" comparator 15 receive respective threshold values VH and VB, common to all the comparators 15 and obtained by a circuit 16. This circuit, connected to the output of flip-flop 10 delivering the signal z for enabling dividers 11, comprises an additional low-pass filter formed by an R-C circuit, identical to the n filters placed at the output of the "exclusive OR" gates 12. The average voltage VM, delivered by the additional low-pass filter, feeds a voltage divider 17 formed by three series-connected resistors, the threshold values VH and VB being the voltages taken at the intermediate points between these three resistors.

The outputs of the n "window" comparators 15 are connected to a sampling and memorization stage 18, possibly formed by n type "D" flip-flops. The outputs of this stage 18 are connected to a priority logic 19, comprising n inverters 20 associated with as many gates 21, whose outputs are finally connected to the address inputs of a multiplexer 22. This latter receives, at its data inputs, the n available clock phases H1, H2 . . . Hn and it delivers, at the time when the sampling pulse u appears, the selected clock phase HS.

Figure 1:
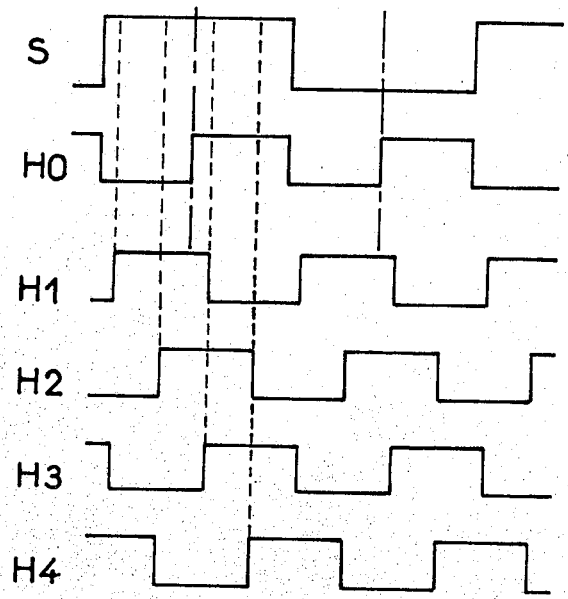
FIG. 1 is a diagram recalling the general known principle of selecting the available clock signal having the most favorable phase, in the case, taken as an example, of four available phases.
Figure 4:
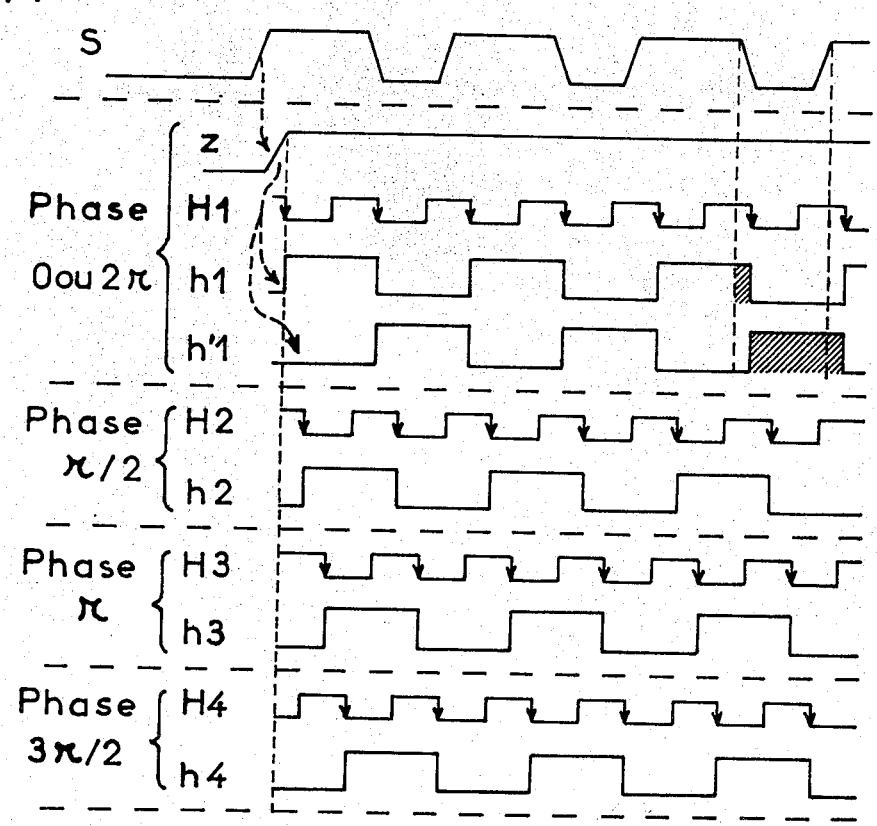
FIGS. 2, 3 and 4 are diagrams illustrating the cases of indetermination or indecision, which the invention avoids.
Figure 2:
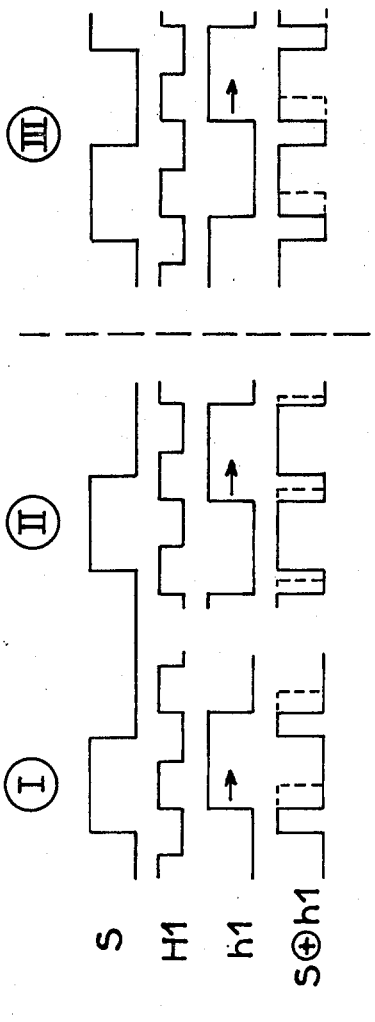
Figure 7:
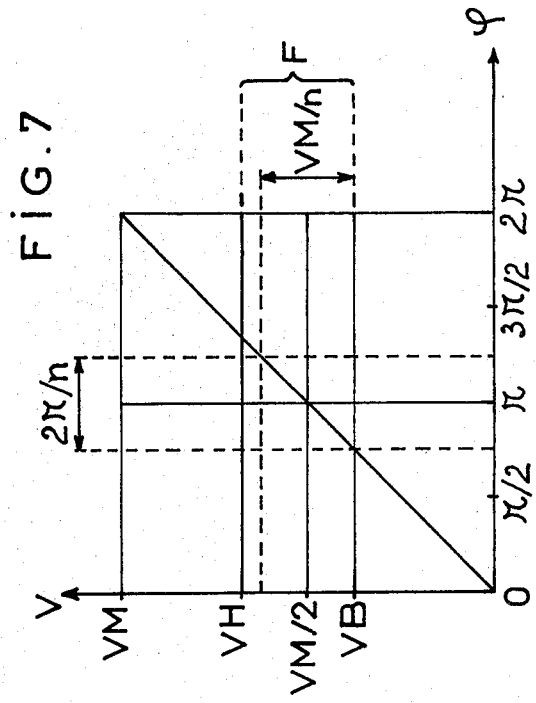
FIGS. 7 and 8 are explanatory diagrams, illustrating the operation of the device of FIG. 6.
Figure 3:
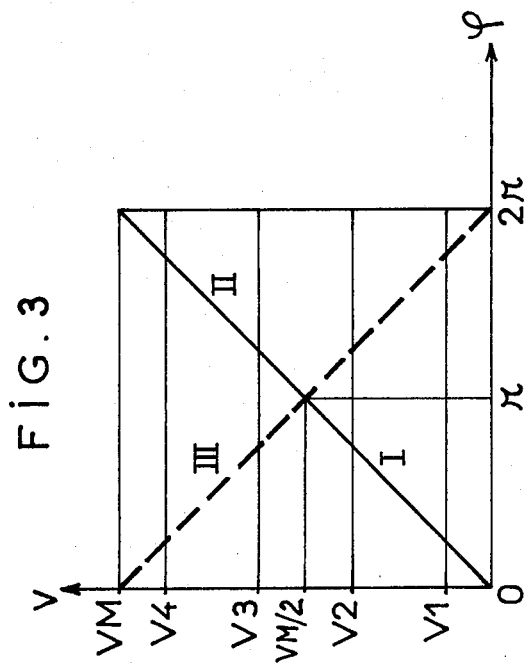

The role of the n "window" comparators 15 is to determine which of the voltages, coming from the n low-pass filters 14, is included in the interval defined by the limit values VH and VB, and corresponding to a phase shift of the order of $\pi$. As shown in the diagram of FIG. 7, voltage VM corresponds to the maximum probable value of the voltage V forming the comparison signal, and the so-called "window" interval F, defined by the values VH and VB, is substantially centered on the maximum half-value VM/2, and has a width substantially equal to VM/n, so as to correspond to the phase interval $\phi$ centered on the value $\pi$ and of a width equal to $2\pi/n$. More exactly, the "window" F has a width a little greater than VM/n, and slightly offcentered, in the direction of the highest values of V, so with a greater phase delay $\phi$, with respect to the theoretical central value VM/n.

Figure 8:
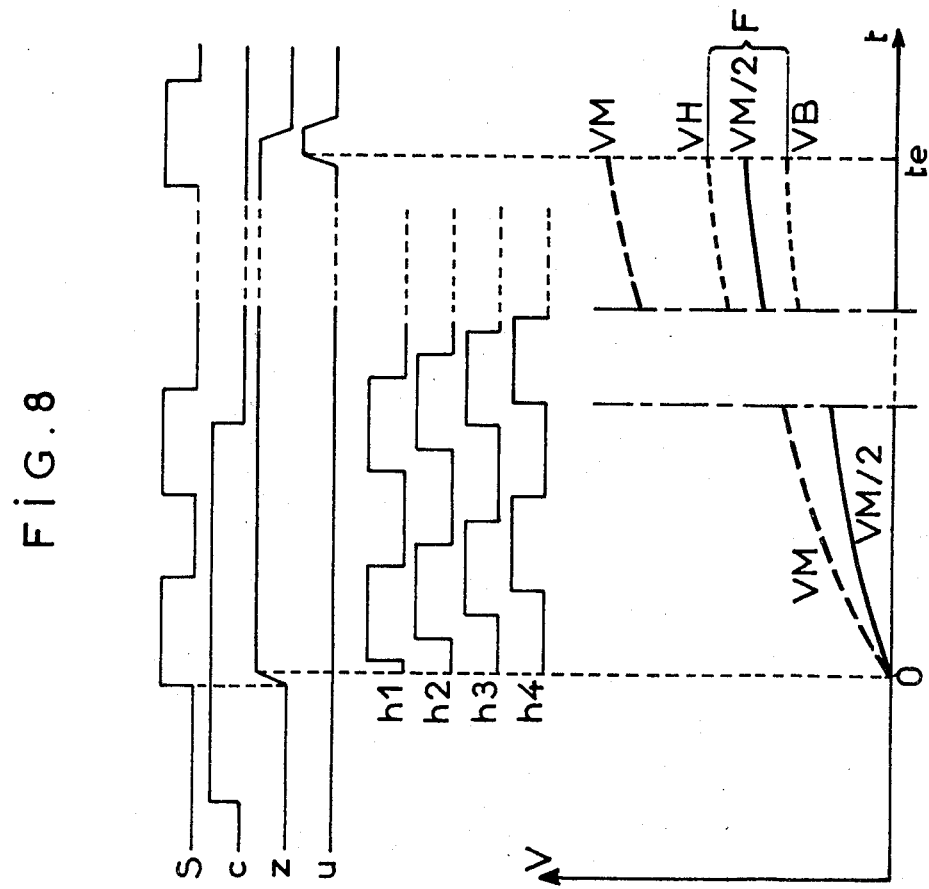

The diagram of FIG. 8 shows the forms of the different signals, which come into a "measurement". The upper lines represent:
the bits of the shaped synchronization burst S,
the counting enabling pulse c,
the counter enabling signal z, marking the time (t=o) initiating the measurement,
the sampling pulse u, appearing at a certain time indicated as te.

The dividers 11 supply, from the original time, the evenly shifted signals h1, h2 . . . , which are compared with the burst S by logic "exclusive OR" gates 12, whereas the low-pass filters 14 establish progressively the average values of the n comparison signals thus obtained. Simultaneously, the additional low-pass filter of circuit 16 generates the voltage VM, as well as the intermediate voltages VH and VB which are proportional thereto, by establishing them progressively, in the same way as the average values of the comparison signals, as illustrated by the curves of the lower part of FIG. 8. At sampling time te, the average voltages at the outputs of the n "exclusive OR" gates 12 are compared with the window "F" defined by the values of the voltages VH and VB obtained at the same time, which allows an indication of the available clock to be obtained which corresponds to the phase shift the closest to $\pi$.

In the case where a double indication is obtained at the output of the comparators, which is not excluded taking into account the width chosen for the "window" F, the priority logic 19 comes into action, so as to select the most advanced clock phase, over the two successive phases corresponding to the double indication obtained.

Multiplexer 22 thus selects, in all cases, a single clock signal HS which is used for reading the data package inserted in the television line, following the synchronization burst S, in the "videotext" system to which the device for phasing a local clock in accordance with the invention applies.

As is evident, the invention is not limited to the single embodiment of this device which has been described above by way of example; it embraces, on the contrary, all variations thereof comprising equivalent means and using the same phasing process.

Figure 5:
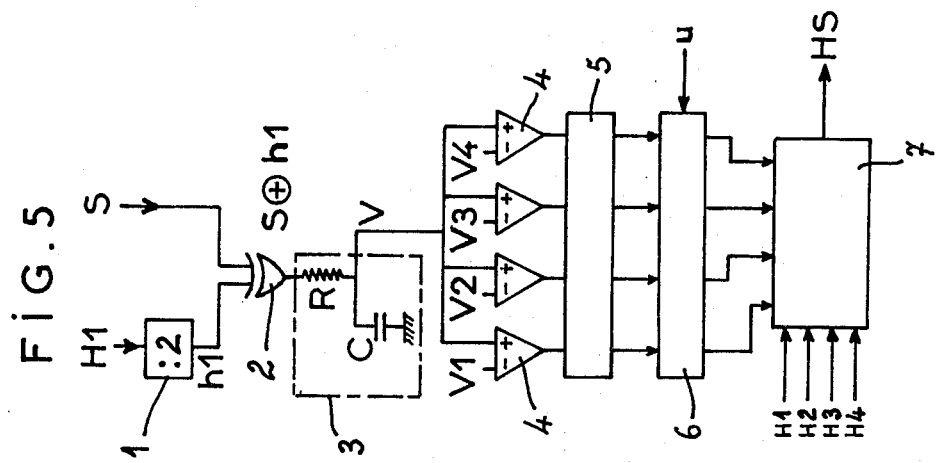
FIG. 5 is a simplified diagram of a device belonging to the state of the technique, in the particular case of selection made between four clock phases.

Thus the circuits of FIG. 6, applicable in principle to any number of phases n, become in practice of a very "heavy" construction when the number of available phases exceeds 4 to 6, and it may be advantageous, in the case where this number n is fairly large, to use a variation for carrying out the selection in two stages: for example, for n=8, in a first stage a comparison is made with 4 of the eight phases (H1, H3, H5 and H7) in accordance with the principle of the invention, with circuits analog to those of FIG. 6, then in a second stage a fine measurement of the phase shift of the clock thus preselected is carried out, by means of a simpler circuit such as the one shown in FIG. 5 (where the risks of error are reduced since the preselected clock phase is already close to $\pi$). Thus one phase out of n may also be preselected by means of the process and the device of the invention, then the phasing improved by any process and device.

What is claimed is:

1. A process for phasing a local clock, in which the most favorable clock signal is selected among n available signals of the same frequency having equal successive phase shifts, by comparison with a synchronization burst, wherein a logic phase comparison is effected between (a) signals obtained by the division of frequency by 'of each of the n available clock phases and (b) the bits of the synchronization burst to obtain a comparison signal, wherein the comparison signal obtained is averaged over several bits of this synchronization burst, and wherein one of the n signals is selected which has a phase shift close to $\pi$, the improvement comprising selecting the most favorable clock phase as being the one represented by a voltage level which is located within an interval or "window" centered substantially on a value equal to half of the maximum probable value VM of the voltage forming the comparison signal, which maximum value would be obtained for the maximum phase shift $2\pi$.

2. The process as claimed in claim 1, wherein the divisions by 2 are enabled as soon as the first bit of the synchronization burst appears.

3. The process as claimed in claim 1, wherein said probable maximum value, from which said "window" is defined, is generated not from a DC supply voltage, but so as to be established progressively, at the same time and substantially with the same relative variations as the voltage forming said comparison signal.

4. The process as claimed in claim 3, wherein said maximum value is progressively established by averaging a logic signal beginning at the time when the divisions by 2 begin.

5. The process as claimed in claim 1, wherein said "window" has a width a little greater than the ideal value VM/n, and slightly offcentered, in a determined direction, with respect to the ideal central value VM/2, and wherein that one is selected of the two available clock phases, possibly obtained by comparison with said "window", which is the most advanced or the most delayed.

6. The process as claimed in claim 5, wherein said "window" is offcentered, in the direction of a greater phase delay, with respect to the ideal value and wherein, in the case of two indications, that one is selected which corresponds to the most advanced available clock phase.

7. A process for phasing a local clock, wherein, in a first stage, a comparison is made with one part of the total number n of available clock phases, in accordance with any one of the preceding claims, so as to preselect a phase and wherein, in a second stage, improvement of the phasing is proceeded with.

8. A device for phasing a local clock providing n available clock phases with a synchronization burst comprising in combination:

a divider by 2 of each of the n available clock phases,
means for enabling each divider by 2, in relation with the changes of state of the synchronization burst,
logic means for comparing between the two signals obtained at the output of each divider by 2 and the bits of the synchronization burst,
a circuit connected to the output of said logic comparison means, and adapted to supply a voltage representing the average value of the comparison signal obtained over several bits,
other comparison means, adapted to compare the above-mentioned voltage with determined levels,
a sampling and memorization stage, associated with a priority logic, connected to the output of the other comparison means,
a multiplexer whose data inputs receive the n available clock signals, and whose address inputs are connected to the outputs of the preceding stage.

9. The device as claimed in claim 8, wherein said logic means for comparison between the signals obtained at the output of each divider by 2 and the bits of the synchronization burst are formed by a logic "exclusive OR" gate.

10. The device as claimed in claim 9, comprising n dividers by 2 connected to common enabling means and receiving respectively the n available clock signals, the output of each divider by 2 being connected to an input of a respective logic "exclusive OR" gate, whose other input receives the bits of the synchronization burst, the output of each of the n "exclusive OR" gates being connected through n low-pass filters giving a voltage representative of the average value of the comparison signal obtained at the output of each of said gates, to n voltage "window" comparators all receiving the same two threshold values, the outputs of these "window" comparators being connected to the sampling and memorization stage.

11. The device as claimed in claim 10, wherein the means for enabling the dividers by 2 have their output also connected to an additional low-pass filter, identical to those placed at the output of the n "exclusive OR" gates, and wherein the voltage delivered by said additional filter supplies a voltage divider giving two proportional voltages corresponding to the limits of the desired "window", these two voltages being fed to the threshold value inputs of n "window" comparators.

12. The device as claimed in claim 11, wherein the means for enabling the dividers by 2, also connected to an additional low-pass filter, are formed by a circuit comprising a logic gate and a flip-flop of the "R-S" type, the gate receiving, at its two inputs, the synchronization burst and a counting enabling pulse, whereas the flip-flop receives, at its "S" input, the output signal of the gate and, at its "R" input, the sampling pulse.

13. The device as claimed in claim 12, wherein the sampling and memorization stage, receiving said pulse, is formed by n type "D" flip-flops.

14. The device as claimed in claim 8, wherein said priority logic comprises n inverters, associated with as many gates.

15. The device as claimed in claim 8, which is applied to a "videotext" system for phasing a clock for reading data packages each of which is inserted into a television line and precedes a synchronization burst.

* * * * *